(12) United States Patent
Yates et al.

(10) Patent No.: US 11,129,078 B2
(45) Date of Patent: Sep. 21, 2021

(54) AUGMENTED PERSONNEL LOCATOR SYSTEM

(71) Applicant: Rockwell Collins, Inc., Cedar Rapids, IA (US)

(72) Inventors: Christopher Yates, Cedar Rapids, IA (US); Laveen Vikram Sundararaj, Hyderabad (IN); Balaramakrishna Rachumallu, Andhra Pradesh (IN)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/821,235

(22) Filed: Mar. 17, 2020

(65) Prior Publication Data
US 2021/0227447 A1 Jul. 22, 2021

(51) Int. Cl.
*H04W 40/20* (2009.01)
*H04W 4/029* (2018.01)
*H04W 4/40* (2018.01)
*G08G 5/00* (2006.01)
*H04W 84/18* (2009.01)
*B64D 43/00* (2006.01)

(52) U.S. Cl.
CPC ............ *H04W 40/20* (2013.01); *B64D 43/00* (2013.01); *G08G 5/0026* (2013.01); *H04W 4/029* (2018.02); *H04W 4/40* (2018.02); *H04W 84/18* (2013.01)

(58) Field of Classification Search
CPC ....... H04W 40/20; H04W 4/029; H04W 4/40; H04W 84/18; B64D 43/00; G08G 5/0026
See application file for complete search history.

(56) References Cited

U.S. PATENT DOCUMENTS

| 5,726,663 | A | * | 3/1998 | Moyer | G01S 5/0027 342/357.34 |
| 9,807,670 | B2 | | 10/2017 | Vermande et al. | |
| 2003/0003893 | A1 | * | 1/2003 | Beni | G01S 19/16 455/404.1 |
| 2006/0188327 | A1 | * | 8/2006 | Moon | G01S 5/0072 403/325 |
| 2007/0294032 | A1 | * | 12/2007 | Zumsteg | G01S 19/49 701/469 |
| 2008/0077326 | A1 | * | 3/2008 | Funk | G08B 25/016 701/500 |

(Continued)

*Primary Examiner* — Ernest G Tacsik
(74) *Attorney, Agent, or Firm* — Suiter Swantz pc llo

(57) ABSTRACT

An augmented personnel locator system (APLS) may include a plurality of identifier nodes and a plurality of intermediate nodes. The plurality of intermediate nodes may be configured in a mesh topology. Each intermediate node may be configured to receive position and status information from at least one identifier node of the plurality of identifier nodes and may be further configured to retransmit the position and status information to a receiver node, either directly or indirectly (e.g., via at least one other intermediate node). The APLS may further include a wireless gateway onboard a vehicle and communicatively coupled to the receiver node. The APLS may further include a vehicle display system configured to receive the position and status information from the receiver node via the wireless gateway and further configured to generate map symbology based on the position and status information for a vehicle display.

20 Claims, 6 Drawing Sheets

(56) References Cited

U.S. PATENT DOCUMENTS

| | | | |
|---|---|---|---|
| 2009/0154398 A1* | 6/2009 | Isozu | H04W 84/18 370/328 |
| 2009/0238087 A1* | 9/2009 | Shikowitz | H04L 67/12 370/252 |
| 2011/0064022 A1* | 3/2011 | Curtin | H04L 45/00 370/328 |
| 2014/0376530 A1* | 12/2014 | Erickson | H04W 12/062 370/338 |
| 2015/0066557 A1* | 3/2015 | Lichti | G08G 1/20 705/7.15 |
| 2016/0233946 A1* | 8/2016 | Wengrovitz | G05D 1/0011 |
| 2018/0241463 A1 | 8/2018 | Lu et al. | |

* cited by examiner

AUGMENTED PERSONNEL LOCATOR SYSTEM

CROSS-REFERENCE TO RELATED APPLICATIONS

The present application claims priority to India Provisional Patent Application No. 202011002282, filed Jan. 19, 2020, entitled augmented personnel locator system, and naming Christopher Yates, Laveen Vikram Sundararaj, and Balaramakrishna Rachumallu as inventors, which is incorporated herein by reference in its entirety.

BACKGROUND

A Personnel Locator System (PLS) has limited application for locating personnel on ground using a personal survival radio such as Army Navy/Portable Radio Communications (AN/PRC-112). For example, personnel may carry a hand held personal survival radio that transmits its current location coordinates, while an aircraft PLS communicates (e.g., via an avionics receiver card) with the personal survival radio to receive the location coordinates. The receiver card may then send the coordinates to a Common Avionics Architecture System (CAAS) Flight Manager (FM). The FM application may resolve the coordinates and feed the position info to the CAAS display via Network Data Object (NDO) carried by Ethernet. The Multi-function Display (MFD) hosting Primary Flight Information and Horizontal Situation Indicator (HSI) may have provision to lay the position info on the HSI compass rose.

It may be desirable for the PLS to be augmented to enhance the mission capabilities as well as to assist the pilot with better guidance and information.

SUMMARY

An augmented personnel locator system (APLS) is disclosed. In one or more embodiments, the APLS includes a plurality of identifier nodes and a plurality of intermediate nodes. Each identifier node includes at least one identifier node position sensor, at least one identifier node status sensor, at least one identifier node controller, and at least one identifier node communication interface. The plurality of intermediate nodes are preferably configured in a mesh topology. Each intermediate node includes at least one intermediate node controller and at least one intermediate communication interface. Each intermediate node may be configured to receive position and status information from at least one identifier node of the plurality of identifier nodes and may be further configured to retransmit the position and status information to a receiver node, either directly or indirectly (e.g., via at least one other intermediate node). The APLS may further include a wireless gateway onboard a vehicle and communicatively coupled to the receiver node. The APLS may further include a vehicle display system configured to receive the position and status information from the receiver node via the wireless gateway and further configured to generate map symbology based on the position and status information for a vehicle display.

In some embodiments of the APLS, the plurality of identifier nodes includes survival radios.

In some embodiments of the APLS, the plurality of identifier nodes includes versatile radios.

In some embodiments of the APLS, at least one identifier node position sensor is a global navigation satellite system receiver.

In some embodiments of the APLS, at least one identifier node position sensor is a terrestrial radio-navigation system receiver.

In some embodiments of the APLS, at least one identifier node position sensor is an inertial navigation system.

In some embodiments of the APLS, at least one identifier node status sensor is a battery state-of-charge sensor.

In some embodiments of the APLS, at least one identifier node status sensor is a physiological sensor.

In some embodiments of the APLS, at least one identifier node status sensor is an environmental sensor.

In some embodiments of the APLS, one or more identifier nodes of the plurality of identifier nodes are further configured to operate as intermediate nodes.

In some embodiments of the APLS, one or more identifier nodes of the plurality of identifier nodes are mobile nodes.

In some embodiments of the APLS, one or more intermediate nodes of the plurality of intermediate nodes are mobile nodes.

In some embodiments of the APLS, the mesh topology is a mobile ad-hoc network (MANET) topology.

In some embodiments of the APLS, the vehicle is an aircraft or a watercraft.

In some embodiments of the APLS, the vehicle display system is further configured to generate vehicle guidance based on the position and status information for the vehicle display.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
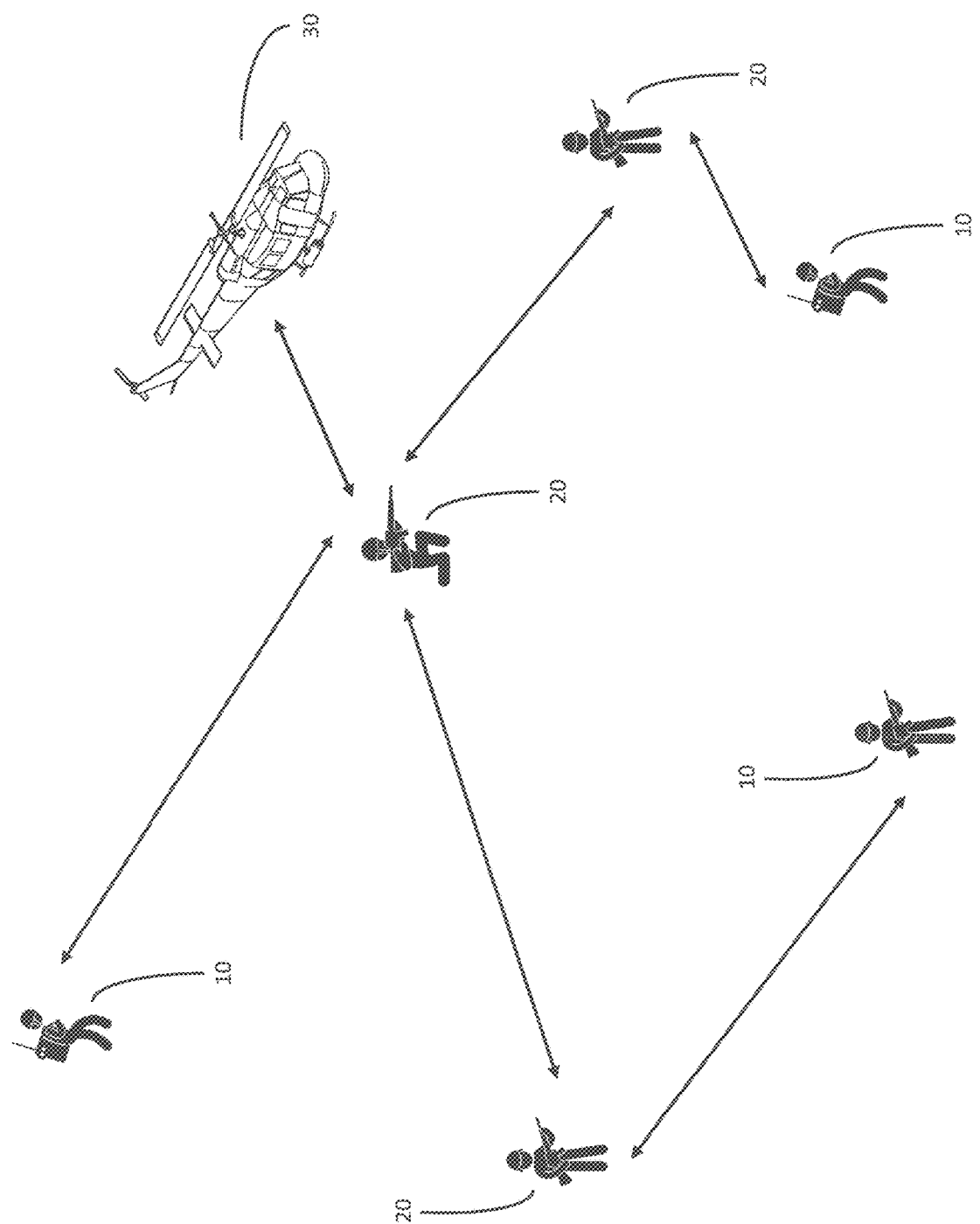
FIG. 1 is an environmental diagram illustrating an augmented personnel locator system (APLS), in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

An augmented personnel locator system is disclosed for enhancing mission capabilities as well as assisting a pilot with beneficial guidance and information. The augmented personnel locator system is often referred to herein as the Augmented Personnel Locator System (APLS). The APLS may be configured to:
1. Enhance the Range of the PLS by working as a mesh over an existing Survival Radio network (e.g., AN/PRC-112);
2. Receive data from versatile radio (not AN/PRC-112) based mesh networks that can use a standard Interface;
3. Process and display more information from nodes than just personnel location;
4. Algorithmically create new way points based on the information received from nodes; and
5. Assist a pilot in a locator based mission by an exclusive cockpit display overlay.

In embodiments, these capabilities may be realized as follows:
1. Survival radio (e.g., AN/PRC-112) may be configured to operate in a Mesh (topology). This can be attempted by modifying the Software-Defined Radio (SDR) or by adding memory/software that can store and forward. The standard or modified AN/PRC-112 data packet may be used where necessary and where applicable.
2. To have a versatile Radio receiver in parallel to the Survival Radio (e.g., AN/PRC-112) receiver that may receive Data from non-Survival radio based Mesh. One of the parallel data paths may be active based on the Network in use (non AN/PRC-112 networks, e.g., IEEE 802.15.4 based Mesh may also be deployed). The non AN/PRC-112 Versatile receiver can link with a non AN/PRC-112 based Mesh.
3. Survival Radio (e.g., AN/PRC-112) based nodes with interfaces configured to take sensor/data inputs so as to provide information other than just location (e.g., status, health, environment, hazards, and the like).
4. A Mesh of non AN/PRC-112 nodes with versatile interface may also be utilized to take in a variety of Data. These nodes may be carried by humans or piggy-backed to other objects (living or non-living) of interest.
5. Such a variety of Data may have the key information to be used by algorithms for suggesting the path of the flight to carry-out the mission.
6. A dedicated graphic overlay on Cockpit Display can be used as Human Machine Interface (HMI) for selecting, deselecting, choosing the various options that aid the Pilot to enhance safety, mission effectiveness and reduce work-load in Search & Rescue (SAR).

Referring to FIG. 1, the Mesh (based on personal survival radios, such as AN/PRC-112 or Versatile radios) may include: Identifier Nodes 10; Intermediate nodes 20; Receiver nodes 30; and Standard Data packet on the Mesh. In embodiments, an Identifier Node carries location sensor, such as Global Positioning System (GPS) receiver. The Identifier Node may include a Radio Frequency (RF) unit that can communicate via Mobile Ad-hoc Network (MANET) by forming a data link with Mesh topology. A battery is preferably utilized to power the entire set-up. This node could be re-usable or expendable. The Intermediate Nodes may simply include an RF unit with a battery to enhance the range of the Mesh. The Identifier Nodes themselves may also be configured to act as repeaters (Intermediate Nodes) by relaying information of other Identifier nodes when not transmitting their own coordinates. The Receiver Node usually is the sink of the Mesh that receives all the data transmitted over the Mesh. The Receiver Node may be onboard the Aircraft/Watercraft. In embodiments, the Receiver Node includes a software application that can feed the coordinates to the FM unit to resolve the coordinates further to be fed to CAAS Displays or could directly interface with the Displays depending on the Architecture.

The Identifier Nodes may vary in size and range depending on their application. While an Identifier node on a Cargo pallet may be bigger and more powerful, that on a canine scout may be smaller. The Mesh may operate at a predetermined frequency range that may be fixed or hopping. While a sub-gigahertz frequency would give a longer range, it would also require a bigger antenna as well. The Mesh may have a standard Data packet that will be generated, transmitted, routed, received and finally discarded on reaching the intended Receiver node. The Data packets can be encrypted for security so that any intruder cannot decrypt the message fast enough. The Data packets can be transmitted/relayed in response to pre-determined query beacon if the Mesh were to maintain certain levels of Radio silence and stealth. By having multiple paths, the source and destination may not be easily traced. Also, some of the Intermediate nodes may be mobile (e.g., rovers), airborne (e.g., drones) or satellite uplinked thus making the Mesh more robust.

A GPS or Inertial Navigation System (INS) that is onboard the Identifier typically generates the location information that is packaged into the Standard Data packet, Encrypted and awaits transmission during an opportune moment. The opportunity could be by virtue of getting range of an Intermediate node or having the desired power levels (after trickle charging) or absence of radio scan by an enemy. The Standard Data packet may include source, destination, payload, error detection/correction, encryption, time stamp, hop info etc. One of the key features of the Mesh is its ability to transmit information other than position coordinates as required by mission. For example, the Identifier node may include a standard interface that can connect to a variety of sensors/data generators. For instance, a medical prognostic device connected to the Transmitter Node may transmit the vitals of the personnel carrying it in addition to his coordinates. This can help the Pilot to prioritize the extraction in case of medivac situation. This additional information will be made available on the MFD's HSI as an extended label around the Locator Symbology. An algorithm running on the Display application may be configured to prioritize/optimize and guide the pilot with his next extraction/waypoint point. In some embodiments, this may be a separate overlay with filters that could be selected/deselected by the pilot.

The Mesh need not be strictly RF during the origin or intermediate hops. For instance, if the Object being located/tagged is underwater, acoustic data link can be used to bridge data till it reaches an RF transmission capable node. This will allow the SAR vehicles to be even more versatile to locate objects that have/are submerged.

The Mesh also helps to locate lost Identifier nodes by virtue of its ability take packets routed by store and forward mechanisms. The Mesh can be programmed to have different routing algorithms based on the mission. The Mesh being a MANET can adopt routing schemes such as Game Theory, Search Theory and Rendezvous Search to locate nodes that are selectively visible (to friendly SAR and not a foe).

The Intermediate Nodes play a key role adding versatility and robustness to the Mesh. The Intermediate Nodes can perform store and forward of standard data packets with intelligence. In embodiments, an Intermediate Node includes an RF unit, Routing intelligence/logic, one or more power sources (e.g., battery packs, generators, etc.) and may be stationary or mobile. The mobility of the Intermediate Nodes may be active or passive. The active nodes may have ability to propel to locations that aid communication. The mobility could be achieved on Land, Air, and Water or (near) Space. The passive nodes may be piggybacked on other carriers whose movements are not aimed to enhance the communication deterministically, but have a good probability to aid the Packet movement probabilistically. Some models of Intermediate nodes could be inexpensive, expendable and could be deployed over vast geographical areas. The more advanced versions could be sizeable and have Satellite uplink or long-range terrestrial data link capabilities. While the small form factor nodes can carry battery packs, the larger ones can have energy generation/harnessing capability by tapping solar or other sources.

The Receiver Nodes may be onboard the Aircraft, Watercraft, or the like. The reception and treatment differ based on the Mesh that provides the Data. In a survival radio-based Mesh, the survival radio's (e.g., AN/PRC-112's) receiver can have expanded capability to receive packet Data that arrive in hops. In a versatile radio-based Mesh, a versatile radio receiver receives Data Packets from RF links (other than AN/PRC-112) and passes it on to the Wireless Gateway. A special receiver may receive Data packet sourced from an entirely different mobile or stationary platform which then gets routed to the Aircraft via connected Aircraft concept or other standard data link (that are not part of the Mesh) and is passed to the Wireless Gateway. The Data packets received from survival radio (Mesh or directly) are fed to Flight Manager (FM) for computation. Data packet from Mesh/Infrastructure not involving Survival Radio are treated by the Wireless Gateway for computation. The computed values are then fed via Ethernet to Cockpit Display System for the MFD to display the symbol on HSI's compass rose.

The Augmented personnel locator system (APLS) may be configured to provide a Locator Flight Plan (LFP) as an Overlay feature. This can be another option in the choice of flight plans available for the Pilot, others being Flight Plan (FPLN) and Alternate Flight Plan (ALTFPLN). The LFP is created by FM working in tandem with the Flight Display Application (or any such equivalent application). The LFP presents a mission specific flight plan with additional information. The LFP has symbols depicting the Object tagged by Identifier node, the key parameters of the object (marked on a label), health/status of the data packets (staleness, hops, range, Signal to Noise ratio etc.). The FM generates an algorithmic suggestion for extraction of the Objects which is presented in the form of LFP on HSI. The Algorithm uses parameters of the Object such as proximity, health, difficulty, window of opportunity, mission needs, etc. The Objects appear as way points for the Pilots to Navigate. The textual and visual cues presented to Pilot in the Overlay can be customized/enabled/disabled using Bezel keys, Control Display Unit (CDU), Multi-Function Control Unit (MFCU) or any such HMI.

Features of the invention may include, but are not limited to, the following:
1. Mesh networking of existing survival radios (e.g., AN/PRC-112) that will enhance range of PLS.
2. A versatile radio-based Mesh network that can handle PLS Data from sources other than just the survival radio (e.g., AN/PRC-112).
3. Pilots to be provided with more than just the positional Information of the Nodes.
4. Algorithmic creation of new way points based on node's Data and hence a Locator Flight Plan.
5. An exclusive overlay in Cockpit Display to assist Pilot in Locator based missions.
6. While MIDS (Multifunctional Information Distribution Systems) and/or TTNT (Tactical Targeting Network Technology) could provide military tactical data, APLS deals with how data can be further used to assist the Pilots by Locator Flight Plan (LFP).

Additional features/improvements may include, but are not limited to, the following:
1. PLS functionality is being implemented in CAAS based Displays for Rotor crafts. The proposed APLS could be provided as an enhanced version or stand-alone.
2. Means of bringing in Data from variety of nodes using RF links and displaying them on Cockpit screen with information about them.
3. This also provides a means of Integrating/connecting various players into a Mesh that can be connected with Cockpit Display.
4. With Drone based missions being preferred more often due to the human liability involved in manned missions, the APLS could increase the safety of the Personnel in an inevitable manned mission.
5. Gives a new dimension to Data centric battle field by connecting the players in the field, bringing in the data and presenting them on Cockpit Displays.
6. Can lead to Ubiquitous Meshes that can be scaled on-the-go by using the versatility of the wireless interface.
7. The Algorithmic way point and Locator Flight Plan creation could very well be used to create the Flight-plan-of-the-future. With more and more Data being made available, well informed decisions/directions could be taken/given by/to the Pilots.
8. A move from Located Personnel to Connected Personnel with the Aircraft playing a central role.

Figure 2:
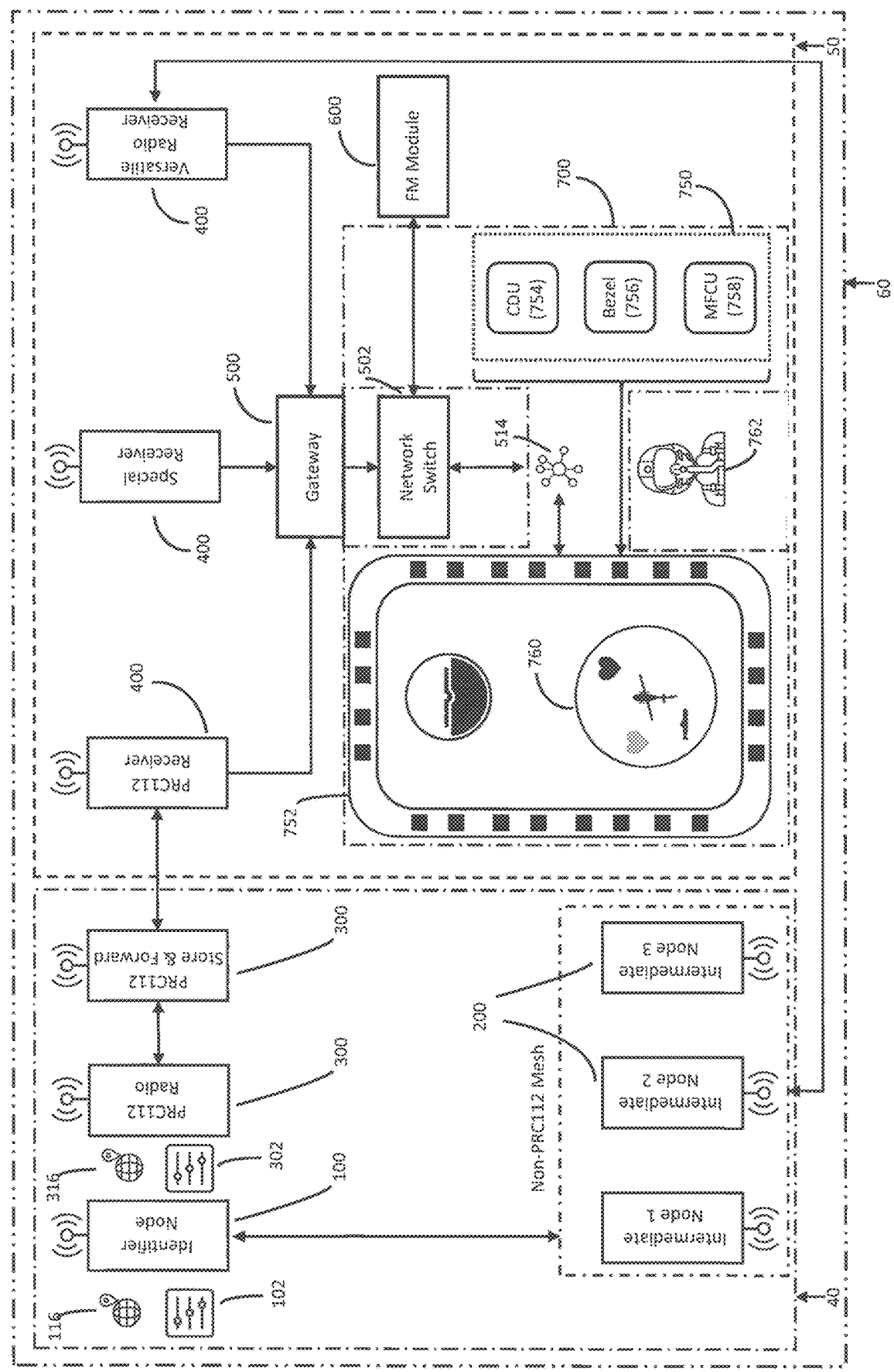
FIG. 2 is a highly schematic diagram illustrating an embodiment of an augmented personnel locator system (APLS) in accordance with one or more embodiments.

In embodiments, the APLS 60 in FIG. 2 comprises of 2 major components namely the Mesh 40 with field equipment and Aircraft/Watercraft 50 with onboard equipment.

Figure 4:
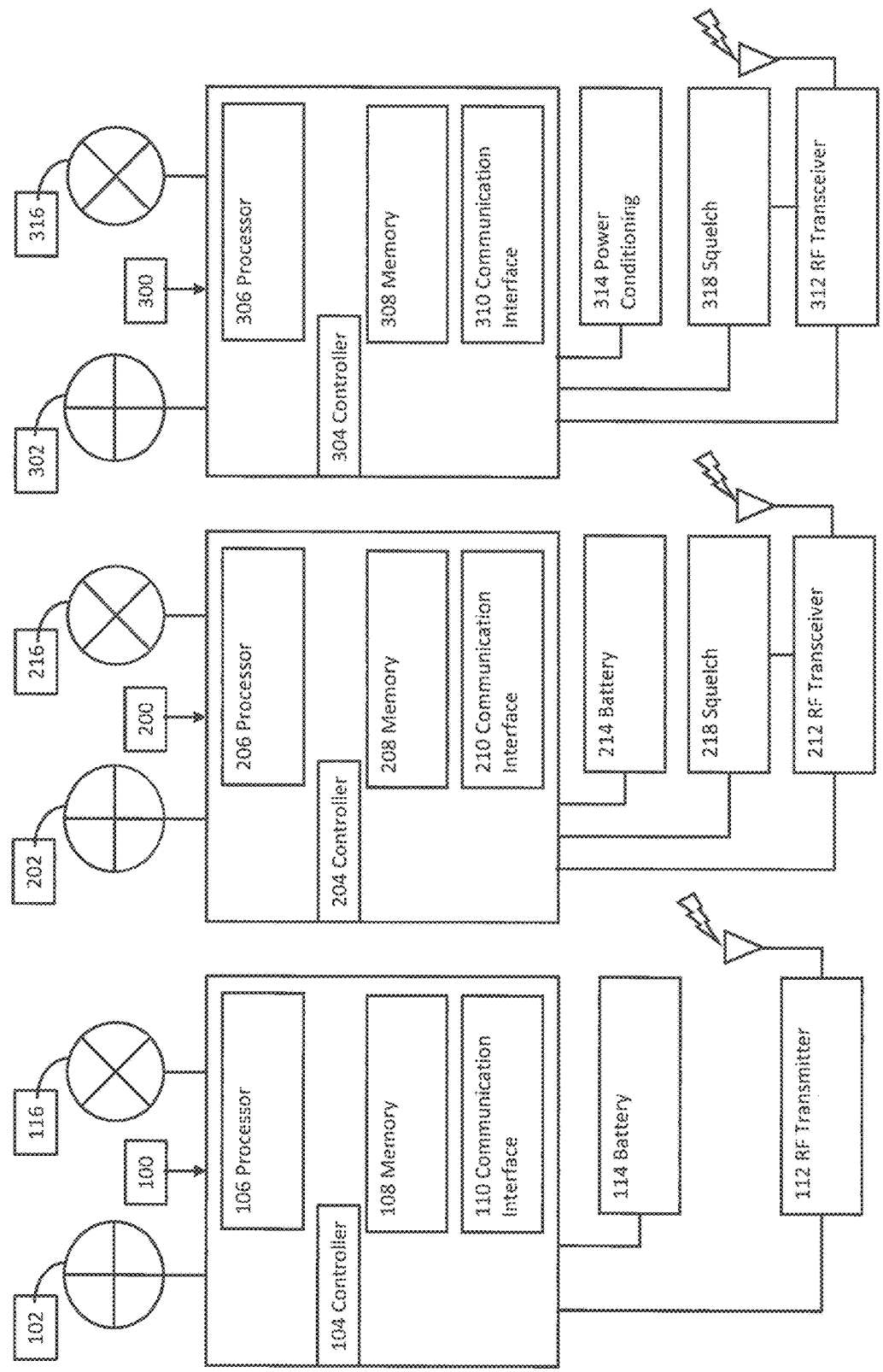
FIG. 4 is a block diagram of an embodiment of the present disclosure.

In embodiments, Identifier Node 100 in FIG2, FIG. 4 comprises of Physiological Sensor 102, Location Identification sensor 116 (e.g., Global Positioning System or Inertial Navigation System), Controller 104 (Processor 106, Memory 108, and Communication Interface 110), RF transmitter 112 and Battery 114. The Physiological Sensor 102 is attached to Personnel body to tap appropriate parameters such as heart beat, blood pressure, body temperature etc. The GPS receiver 116 or other form of location/position sensor 116 (like inertial sensor) shall gather the location info of Personnel. The data is then fed to the controller 104 via the communication interface 110. The communication Interface takes the data and feeds to the processor which creates the standard (data) packets by adding other essential info such as source Identifier, packet identifier, destination address, error detection, error correction, encryption etc. The standard packets are stored in memory 108 in queue for transmission via the RF unit 112. The electronics are powered by the battery 114. The Identifier node is part of the Mesh 40 which is outside the Aircraft/Watercraft 50.

In embodiments, Intermediate Node 200 in FIG. 2, FIG. 4 comprises of RF transceiver 212, Controller 204 (Processor 206, Memory 208, and Communication Interface 210) and Battery 214. It may also have Physiological Sensor 202 and Location Identification sensor 216 (e.g., Global Positioning System or Inertial Navigation System) especially if it is also carried by personnel (who needs to be located as well). The RF unit 212 receives the incoming standard packet from an Identifier Node 100 or Intermediate Node 200 and sends it to controller 204 via communication interface 210. The processor 206 in controller 204 then routes the standard packet based on the destination address. The standard packet is stored in memory 208 and retransmitted via the RF unit 212. Squelch circuitry 218 may control the RF unit 212 during the switching process. The routing tables may be stored in the Memory 208 for static or dynamic routing. The Intermediate node is part of the Mesh 40 which is outside the Aircraft/Watercraft 50.

In embodiments, Modified AN/PRC-112 300 in FIG. 2, FIG. 4 include circuitry for relaying the standard packet and Physiological Sensor 302. This is in addition to the primary location sensor 316 (e.g., Global Positioning System). The modification shall comprise of Controller 304 (Processor 306, Memory 308, and Communication Interface 310), RF transceiver 312 and Power conditioning 314. The RF unit 312 receives the incoming standard packet which is fed to the controller 304 via the communication interface 310. The Controller 304 then processes the standard packet for outbound transmission based on destination address. Processing includes reading the destination address in the standard packet. Decryption may be done prior to reading. The standard packet is stored in memory 308 and retransmitted via the RF unit 312. Squelch circuitry 318 may control the RF unit 312 during the switching (between reception and transmission). The controller 304 may refer routing algorithms/tables resident in Memory 308 which is invoked by the software application running on the processor 306. The Modified AN/PRC-112 300 is part of the Mesh 40 which is outside the Aircraft/Watercraft 50.

Figure 5:
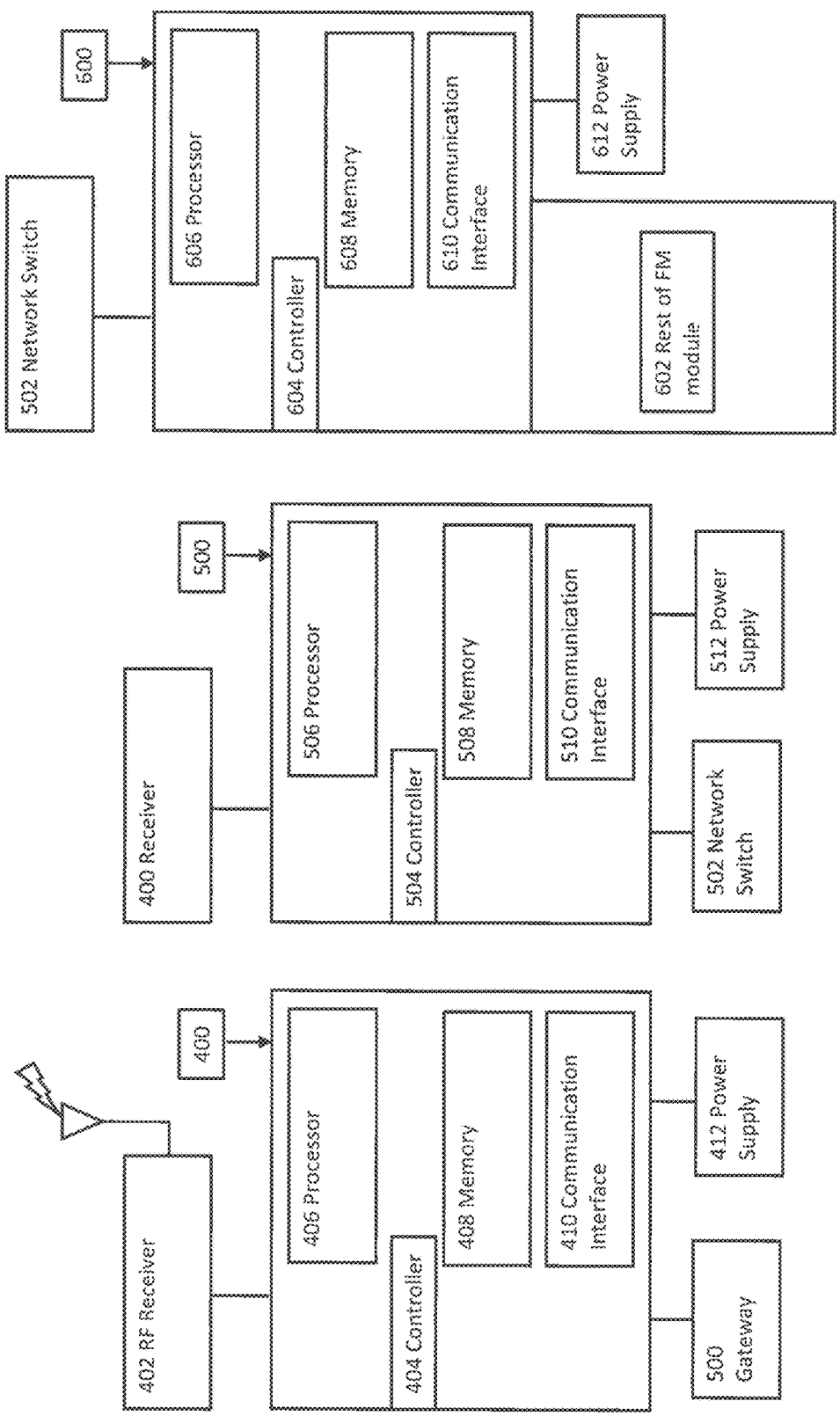
FIG. 5 is a block diagram of an embodiment of the present disclosure.

In embodiments, Receiver 400 (AN/PRC-112 or Special or Versatile) in FIG. 2, FIG. 5 comprises of RF receiver 402, Controller 404 (Processor 406, Memory 408, and Communication Interface 410) and Power supply 412 electronics. The standard packet is received by the RF receiver 402 and fed to the Controller 404 via the communication interface 410. The processor 406 in controller 404 processes the standard packet to accept or discard the same based on the correctness/completeness. Incomplete or mutilated packets may be reconstructed by algorithms. The standard packet is then scrubbed off other information (destination address, error detection, error correction, encryption etc.) into a short packet and is then fed to the Gateway 500 via the communication interface 410. The receiver 400 may be specific to the communication protocol they are designed to operate with or generic to work with multiple protocols. The Receiver 400 is onboard the Aircraft/Watercraft 50.

In embodiments, Gateway 500 in FIG. 2, FIG. 5 comprises of Controller 504 (Processor 506, Memory 508, and Communication Interface 510), Power supply 512 electronics. The short packet that is created by the receiver is repacked into internal packet so as to be transmitted to the Flight Manager (FM) 600 module. The Controller 504 has the software application to process short packet created by different kinds of receivers 400 and seamlessly create internal packets. Key information retained in short packet such as source Identifier, packet identifier are appended with info to create internal packets that can be handled by the Network switch 502 and further by the Avionics Systems LAN. The Gateway 500 is capable of receiving short packet from different types of receiver 400. It is also capable of transmitting internal packets to different types of Switches 502 and Avionics Systems LAN 514 downstream. The Gateway 500 thus makes the APLS compatible with very many of the existing Avionics switches and buses. The Gateway 500 is onboard the Aircraft/Watercraft 50.

In embodiments, FM module 600 in FIG. 2, FIG. 5 shares Controller 604 (Processor 606, Memory 608, and Communication Interface 610) meant for its dedicated Flight management function. It takes-in internal packet from Gateway 500 through network switch 502 and communication interface 610. It computes the real world co-ordinates from the internal packet. The real world co-ordinates of a given personnel along with associated physiological parameters, environmental parameters, battery state-of-charge are supplied to the display through Network switch 502 via Avionics Systems LAN 514. The FM module 600 is onboard the Aircraft/Watercraft 50.

Figure 3:
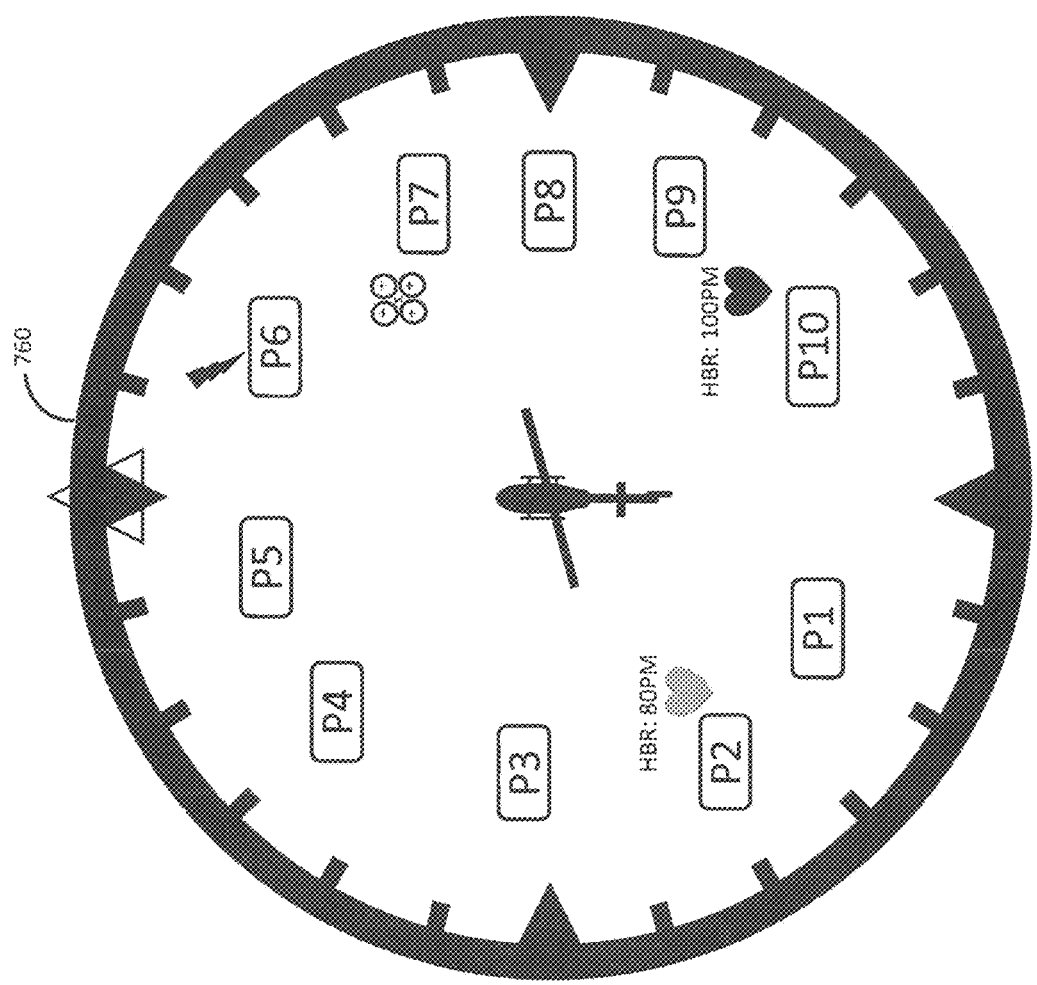
FIG. 3 is a highly diagrammatic view of HSI 760 in cockpit display for illustrating relative personnel position to an aircraft in an embodiment of the APLS of the current disclosure.
Figure 6:
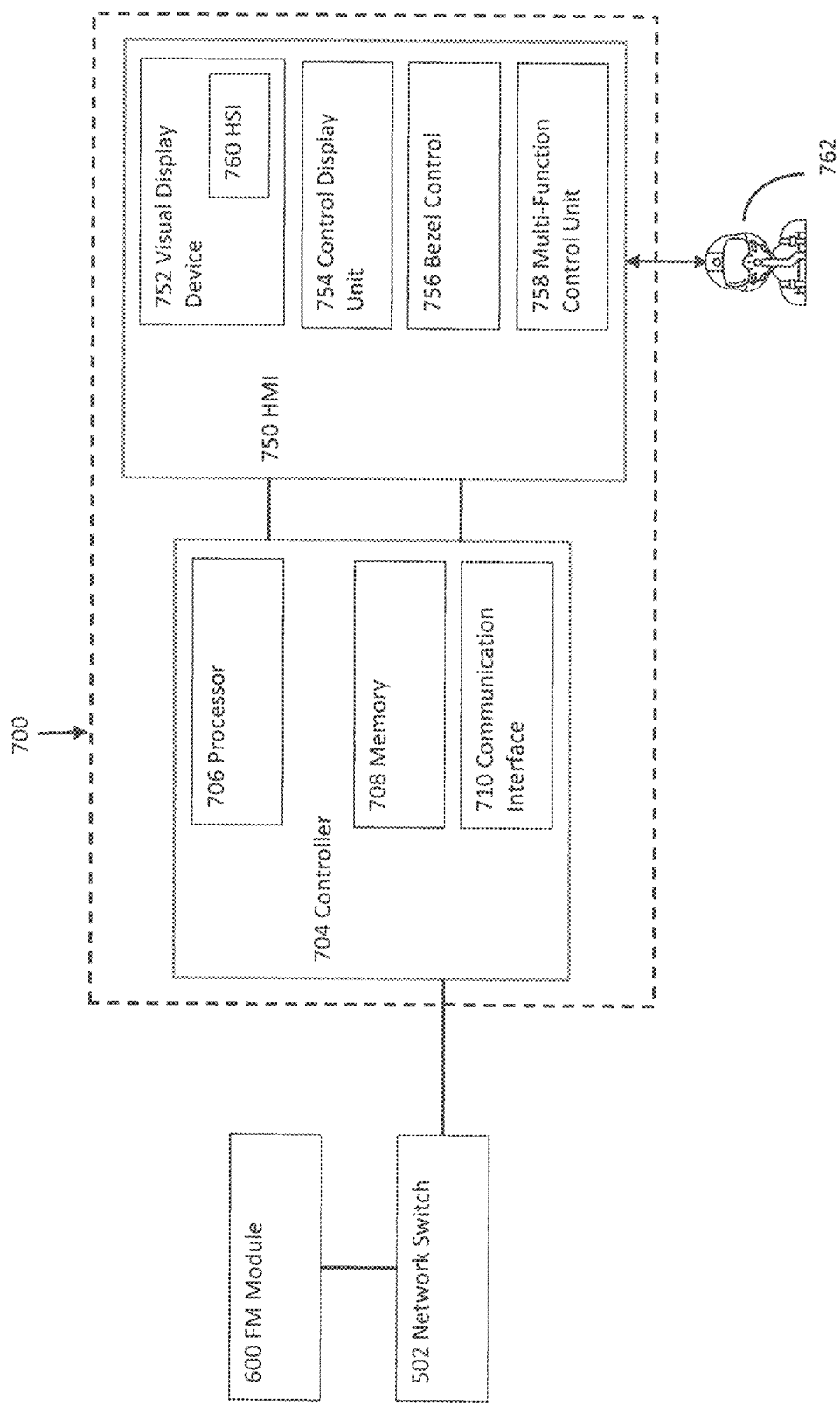
FIG. 6 is a block diagram of an embodiment of the present disclosure.

In embodiment, Flight Deck Display 700 in FIG. 2, FIG. 6 receives real world co-ordinates and associated parameters of the personnel from FM module 600. The real world co-ordinates is converted to Map Horizontal Item list and is plotted on the HSI 760 rendering of Visual Display Device 752. The physiological parameters such as heart beat, temperature or status parameters such as battery level of the nodes transmitting are displayed alongside symbol representing the personnel on HSI 760 as in FIG. 3. When the node is not carried by a single personnel, but by a mobile asset such as boat or drone, the same is depicted with a suitable symbol. The HMI 700 Input devices such as Control Display Unit 754 (Enter Flight Plan), Bezel control 756 (to choose between various display options), Multi-Function Control Unit 758 (pointer Et tab to make changes to the cursor) or the like are used by Pilot 762 to customize the content being displayed. These are shared with the other dedicated functions they have. The Flight Deck Display 700 is onboard the Aircraft/Watercraft 50.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A personnel locator system, comprising:
   a plurality of identifier nodes, each identifier node including at least one identifier node position sensor, at least one identifier node status sensor, at least one identifier node controller, and at least one identifier node communication interface;
   a plurality of intermediate nodes configured in a mesh topology, each intermediate node including at least one intermediate node controller and at least one intermediate communication interface, each intermediate node including a radio frequency (RF) transceiver, the RF transceiver configured to receive a data packet including a destination address, position information, and status information from at least one identifier node of the plurality of identifier nodes; the RF transceiver being further configured to retransmit the data packet including the destination address, the position information, and the status information to a receiver node directly or by at least one other intermediate node of the plurality of intermediate nodes; and
   an aircraft, comprising:
      the receiver node configured to receive the data packet;
      a wireless gateway communicatively coupled to the receiver node by a first communication interface, the wireless gateway configured to receive at least the position information and the status information from the receiver node by the first communication interface, the wireless gateway configured to transmit at least the position information and the status information to a network switch by a second communication interface;
      a flight manager (FM) module including a controller communicatively coupled with the network switch by a third communication interface for receiving at least the position information and the status information, the controller configured to resolve the position information, the FM module further configured to transmit the resolved position information and the status information to the network switch by the third communication interface;
      the network switch communicatively coupled with a flight deck display by a local area network; and
      the flight deck display configured to receive the resolved position information and the status information from the network switch, the flight deck display further configured to generate map symbology based on the resolved position information and the status information on a horizontal situation indicator of the flight deck display.

2. The personnel locator system of claim 1, wherein the plurality of identifier nodes includes Army Navy Portable Radio Communications-112 (AN/PRC-112) radios.

3. The personnel locator system of claim 2, the aircraft further comprising an additional receiver node, the additional receiver node configured to receive a data packet from a non-AN/PRC identifier node, the additional receiver node communicatively coupled to the wireless gateway.

4. The personnel locator system of claim 3, wherein the data packet received from the non-AN/PRC identifier node is a data packet according to an IEEE 802.15.4 based mesh.

5. The personnel locator system of claim 1, wherein the at least one identifier node position sensor comprises a global navigation satellite system receiver or a terrestrial radio-navigation system receiver.

6. The personnel locator system of claim 1, wherein the at least one identifier node position sensor comprises an inertial navigation system.

7. The personnel locator system of claim 1, wherein the at least one identifier node status sensor comprises a battery state-of-charge sensor.

8. The personnel locator system of claim 1, wherein the at least one identifier node status sensor comprises a physiological sensor.

9. The personnel locator system of claim 1, wherein the at least one identifier node status sensor comprises an environmental sensor.

10. The personnel locator system of claim 1, wherein one or more identifier nodes of the plurality of identifier nodes are further configured to operate as intermediate nodes by the at least one identifier node controller and an RF transceiver of the one or more identifier nodes, the controller including a processor and a memory.

11. The personnel locator system of claim 10, wherein the one or more identifier nodes are configured to operate as intermediate nodes when not transmitting position information or status information associated with the one or more identifier nodes.

12. The personnel locator system of claim 1, wherein one or more intermediate nodes of the plurality of intermediate nodes are mobile nodes.

13. The personnel locator system of claim 1, wherein the network topology comprises a mobile ad-hoc network (MANET) topology.

14. The personnel locator system of claim 1, wherein the receiver node is configured to scrub at least the destination address from the data packet before transmission of at least the position information and the status information to the wireless gateway; wherein the wireless gateway is configured to repack at least the position information and the status information before transmission to the network switch;

wherein the FM module resolves the position information by computing real world co-ordinates of the plurality of identifier nodes based on the repacked position information.

15. The personnel locator system of claim 1, wherein the flight deck display is further configured to generate vehicle guidance based on the position and status information for the vehicle display.

16. The personnel locator system of claim 1, wherein the flight deck display creates a way point for extraction by prioritization based on the position and status information.

17. The personnel locator system of claim 1, wherein the flight deck display has a human machine interface (HMI) for a pilot to optionally select the guidance content.

18. The personnel locator system of claim 1, wherein the identifier nodes and the intermediate nodes are configured to collect physiological parameters by strap-on sensors.

19. The personnel locator system of claim 1, wherein the intermediate nodes are configured to be commanded to move to aid data routing.

20. The personnel locator system of claim 1, wherein data packets from identifier nodes and intermediate nodes are configured to be routed to the receiver node based on a routing table.

* * * * *